US008923876B2

(12) United States Patent
Comeau

(10) Patent No.: US 8,923,876 B2
(45) Date of Patent: Dec. 30, 2014

(54) ADAPTIVE UPLINK COORDINATED MULTIPOINT COMMUNICATION FOR BACKHAUL

(75) Inventor: Adrien Joseph Comeau, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 191 days.

(21) Appl. No.: 13/587,592

(22) Filed: Aug. 16, 2012

(65) Prior Publication Data

US 2014/0051471 A1  Feb. 20, 2014

(51) Int. Cl.
*H04W 72/04* (2009.01)

(52) U.S. Cl.
USPC ............. 455/452.1; 455/509; 370/329

(58) Field of Classification Search
CPC ............ H04B 1/06; H04B 1/60; H04B 7/024; H04B 7/0404; H04B 7/0406; H04B 15/00; H04B 17/00
USPC ............ 455/41.1, 422.1, 452.1, 452.2, 456.1, 455/67.11, 500, 509; 370/328, 329
See application file for complete search history.

(56) References Cited

U.S. PATENT DOCUMENTS

| 2011/0041021 | A1 | 2/2011 | Khoshnevis et al. | |
|---|---|---|---|---|
| 2011/0263271 | A1* | 10/2011 | Hoymann et al. | 455/456.1 |
| 2012/0184218 | A1 | 7/2012 | Boudreau et al. | |
| 2012/0201202 | A1 | 8/2012 | Hong et al. | |
| 2013/0215833 | A1* | 8/2013 | Ong et al. | 370/329 |

FOREIGN PATENT DOCUMENTS

| EP | 2 246 992 A1 | 11/2010 |
|---|---|---|
| WO | 2010034528 A1 | 4/2010 |
| WO | 20110035109 A2 | 3/2011 |

OTHER PUBLICATIONS

International Search Report and Written Opinion canceled on Apr. 2, 2014 and dated Mar. 21, 2014 for International Application No. PCT/IB2013/056652, International Filing Date: Aug. 14, 2013—consisting of 17-pages.
Invitation to Pay Additional Fees dated Apr. 2, 2014 for International Application No. PCT/IB2013/056652, International Filing Date: Aug. 14, 2013—consisting of 5-pages.
3GPP TSG-RAN WG1 ,Meeting #58, R1-09-3019, Source: Alcatel-Lucent, Title: "Definition of Backhaul According to Level of Cooperation in CoMP UL", (Aug. 24, 2009) consisting of 3-pages.
International Search Report and Written Opinion dated Jun. 12, 2014 for International Application No. PCT/IB2013/056652, International Filing Date: Aug. 14, 2013—consisting of 19-pages.

* cited by examiner

*Primary Examiner* — Thanh Le
(74) *Attorney, Agent, or Firm* — Christopher & Weisberg, P.A.

(57) ABSTRACT

A method and system for adaptive coordinated multipoint support in a wireless communication system are disclosed. According to one aspect, the invention provides an uplink coordinated multipoint, CoMP, method. A CoMP request is received at a cooperating base station from a serving base station. The CoMP request specifies a first CoMP payload type. Responsive to receiving the CoMP request, a second type of CoMP payload to provide to the serving base station is provided. The second type of CoMP payload is determined based at least in part on resource usage. The cooperating base station provides a CoMP payload of the determined second CoMP payload type to the serving base station.

14 Claims, 6 Drawing Sheets

ADAPTIVE UPLINK COORDINATED MULTIPOINT COMMUNICATION FOR BACKHAUL

TECHNICAL FIELD

The present invention relates to a method and system for adaptive coordinated multipoint support in a wireless communication network.

BACKGROUND

The growing demands on mobile networks to support data applications at higher throughputs and spectral efficiencies have driven the need to develop Orthogonal Frequency Division Multiplexing (OFDM) based 4th generation (4G) networks including third generation partnership project, 3GPP, Long Term Evolution (LTE) networks. Because of the scarcity of spectrum, the same frequencies are reused at all cell sites. The resulting interference limited system will not achieve the full potential capacity that the LTE standard can support without the implementation of one or more interference mitigation and or cancellation techniques. Interference mitigation and/or cancellation techniques have been investigated and deployed with varying degrees of success in mobile networks for over 20 years. Traditional approaches have focused on ensuring orthogonality between transmitted signals in time or frequency. Other systems operate spatially or by actively removing and cancelling interfering signals from the desired signal.

In early second generation, 2G, cellular systems, orthogonality was achieved primarily through static pre-planned allocations of radio resources. Third generation, 3G, systems introduced interference cancellation techniques based mostly on a combination of blind information gathered at a base station such as spectrum usage monitoring and coarse exchange of interference indicators such as the Rise over Thermal (RoT) indicator employed in the 3GPP 1xEV-DO standard. Typically interfering signals have been estimated using blind detection and their estimates subtracted from the desired signals.

In 4G networks, the advanced evolution of LTE has focused on Coordinated Multipoint (CoMP) as a means to improve performance of the air interface. The central concept of Uplink Coordinated Multipoint (UL CoMP) is that although a user equipment, UE, is served by one cell, the neighboring cells may receive the UE's signal with sufficient quality such that they may be able to contribute to the reception of the UE's signal.

A fundamental problem of UL-CoMP is the cost and complexity of the needed transport network required to deliver signals between cells. One solution involves transporting digitized RF spectrum signals from the radios of neighboring cells. This requires a bandwidth on the order of 2.5 Gbps per 2 branch diversity 20 MHz carrier. After provisions are made to allow multiple cells to share with neighboring cells, the amount of required inter cellular bandwidth easily exceeds the non-CoMP case by a factor of 20 to 40 times. Only a very limited number of operators, those having a very favorable transport cost model, can afford to ubiquitously deploy a system having such a heavy backhaul capacity.

SUMMARY

The present invention advantageously provides a method and system for adaptive coordinated multipoint support in a wireless communication system. According to one aspect, the invention provides an uplink coordinated multipoint, UL-CoMP, method. A UL-CoMP request is received at a cooperating base station from a serving base station. The UL-CoMP request specifies a first CoMP payload type. Responsive to receiving the UL-CoMP request, a second type of CoMP payload to provide the serving base station is determined. The second type of CoMP payload is determined based at least in part on resource usage. The cooperating base station provides a CoMP payload of the determined second CoMP payload type to the serving base station.

According to another aspect, the invention provides a cooperating base station having a memory and a processor. The memory is configured to store payload data associated with a CoMP payload type. The processor is configured to receive a CoMP request from a serving base station and to select one of a plurality of CoMP payload types of a CoMP payload having the payload data. The selection is based at least in part on resource usage. The cooperating base station sends the CoMP payload to the serving base station.

According to another aspect, the invention provides a serving base station. The serving base station includes a processor responsive to a received CoMP payload type. The processor is configured to perform switch diversity when the received CoMP payload type is a TB payload type. The processor is configured to perform hybrid automatic repeat request, HARQ, diversity when the received CoMP payload type is an LLR payload type. The processor is configured to perform analysis of multiple CoMP payloads received from multiple cooperating base stations when the received CoMP payload type is an FD-IQ payload type.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
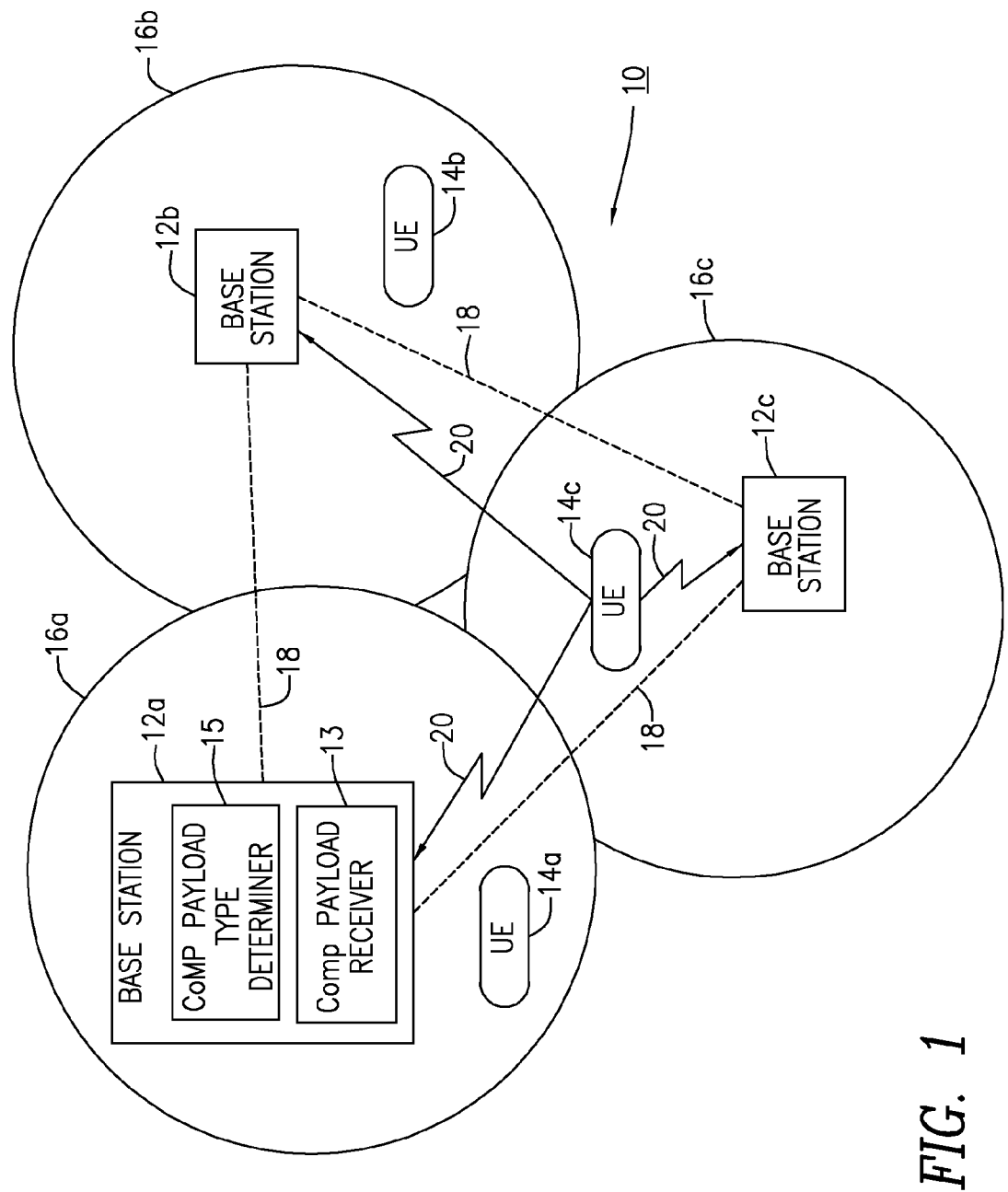
FIG. 1 is a diagram of an exemplary communication network that utilizes adaptive coordinated multipoint support in accordance with the principles of the present invention.

Before describing in detail exemplary embodiments that are in accordance with the present invention, it is noted that the embodiments reside primarily in combinations of apparatus components and processing steps related to adaptive coordinated multipoint support in a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures, in which like reference designators denote like elements, there is shown in FIG. 1 a diagram of one embodiment of a coordinated multi-point network 10, constructed in accordance with principles of the present invention. The network 10 includes a plurality of geographically dispersed user equipment mobile terminals 14a, 14b, 14c, referred to collectively herein as user equipment (UE) 14, each located within a corresponding geographic area 16a, 16b, 16c referred to collectively herein as cells 16. Each cell 16 is served by a respective base station 12a, 12b, 12c, referred to collectively herein as base stations 12. Each base station 12 receives uplink signals from the UEs 14 and processes (e.g., decodes) the uplink signals to recover information symbols therein.

A base station, e.g., base station 12a, serving certain UEs, e.g. UE 14a, may nonetheless also receive uplink signals from other UEs, e.g., UE 14c, located within another cell, e.g., cell 16c. Rather than simply treating such uplink signals as inter-cell interference, the base station 12a cooperates with the UEs' serving base station 12c. In particular, the base station 12a sends the uplink signals to the UEs' serving base station 12c over a backhaul communication link 18 between the base stations 12. The UEs' serving base station 12c then jointly processes the uplink signals it received itself and the uplink signals received from other base stations 12 in order to mitigate inter-cell interference. It will be understood that in some embodiments, multiple cells may be serviced by a single base station. Thus, for example, two or more cells may be hosted from a common physical location. In these cases, a CoMP payload may be shared between cells hosted at the same physical location by connections between entities at the physical location. These connections may be inter-card or inter-unit connections.

Any given base station, e.g., base station 12a, therefore operates as a serving base station with respect to UEs 14 located within its served cell, e.g. cell 16a, while operating as a so-called cooperating base station with respect to UEs, e.g., UEs 14b and 14c located within another cell, e.g., cell 16b. Likewise from the perspective of any given mobile terminal, e.g., UE 14a, one base station 12a operates as the serving base station for the UE and other base stations 12b and 12c operate as cooperating base stations for that UE.

Each base station 12, such as the base station 12a, acting as a serving base station therefore includes a CoMP payload receiver 13 which receives a CoMP payload of a certain type from a cooperating base station such as the base stations 12b and 12c. As will be explained more fully below, each base station 12 acting as a cooperating base station has a CoMP payload type determiner 15 that determines a type of CoMP payload to be sent to a serving base station.

Notably, the cooperating base stations 12 send the CoMP signal corresponding to the uplink signal 20 in a way that advantageously fits within the bandwidth capabilities for the backhaul communication links 18, as compared to approaches that simply send raw samples of the uplink signal 20. In general, any cell can seek assistance from any other cell, subject to a cell's available bandwidth and processing capabilities, and subject to a bandwidth of a backhaul link 18 connecting the cells. For example, transmitting transport blocks, TB, requires less bandwidth and is more delay tolerant than transmitting log-likelihood ratios, LLR, which require less bandwidth than transmitting frequency domain IQ, FD-IQ, samples, which require less bandwidth than transmitting time domain IQ, TD-IQ, samples. The details for generating these blocks or samples are known in the art and are beyond the scope of the present invention.

Figure 2:
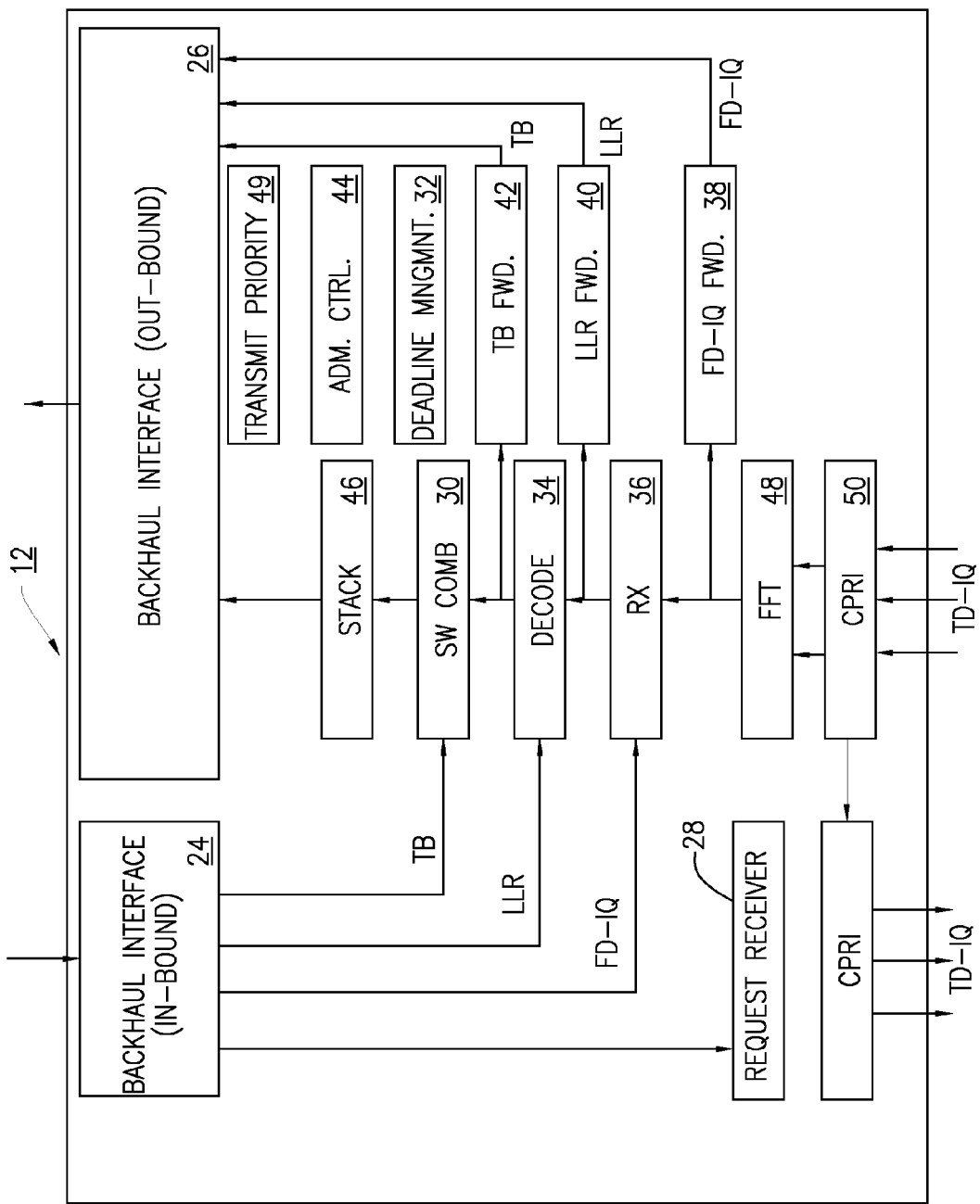
FIG. 2 is a block diagram of an exemplary digital signal processing sub system of a base station constructed in accordance with principles of the present invention.

FIG. 2 is a block diagram of an exemplary digital processing sub system of a base station 12 constructed in accordance with principles of the present invention. The base station 12 has an in-bound backhaul interface 24 that receives requests for CoMP assistance from one or more serving base stations, and receives CoMP payloads from cooperating base stations. The base station 12 also has an out-bound backhaul interface 26 that sends CoMP payloads to one or more serving base stations, and sends one or more CoMP requests to cooperating base stations. Thus, the base station 12 may function as a serving base station and as a cooperating base station.

The base station 12 includes a request receiver 28 that receives and arbitrates requests for CoMP assistance from other serving base stations. The requests for CoMP assistance includes a preferred CoMP payload type, such as, for example, TB, LLR, FD-IQ or TD-IQ. The CoMP request also may include whatever information is necessary or useful to carry out the CoMP support. Such information may include the grant information for the desired UE, and or the priority of the request and or quality thresholds for feedback.

When the base station 12 is functioning as a serving base station and the CoMP payload type is TB, the switch (SW) combiner block 30 uses the incoming TB data to perform switch diversity. For example, some cooperating base stations may detect a passing cyclic redundancy check, CRC, of a transport block, while others may not. If a TB passes a CRC, it is forwarded to the serving base station. A TB that does not pass a CRC is not forwarded. Thus, the serving base station switches to receive a TB from one of the cooperating base stations that sends a passing TB.

The SW combiner block 30 is caused to operate under the control of a deadline manager block 32, so that decisions are made with the available received TB at the time of receipt and within a particular transmission time interval, TTI. In some embodiments, no incoming screening or prioritization of available received TB is required, because only passing blocks were transmitted to the base station 22.

When the base station 12 is functioning as a serving base station and the CoMP payload type is LLR, the decode block 34 uses the available incoming LLR data to perform HARQ-like diversity. That is, the LLRs from more than one cooperating base station are combined. The decode bock 34 operates under the control of the deadline manager block 32, so that decisions are made with the available received LLR at the time of receipt and within a particular TTI. Screening and prioritization of available received LLR may be performed because only best quality LLR data should be used.

When the base station 12 is functioning as a serving base station and if the CoMP payload type is FD-IQ, the RX block 36 uses the available incoming FD-IQ data to perform enhanced receiver operation, which may include combining FD-IQ data from two or more cooperating base stations. The RX block 36 is caused to operate under the control of the deadline manager block 32, so that the RX block 36 is triggered to complete processing of incoming FD-IQ data within a particular TTI. Screening and prioritization of available received FD-IQ data may be performed because the RX block 36 may have limited capabilities and only the best quality of FD-IQ data should be used.

When the base station 12 is functioning as a cooperating base station and if the CoMP payload type is selected to be FD-IQ, the FD-IQ Fwd block 38 extracts the target UE's resource blocks, RB. The FD-IQ Fwd block 38 preferably removes signals of locally scheduled UE and dominant interferers. If a quality of the extracted RBs exceeds a quality threshold provided by the serving base station, the FD-IQ packet is formed and transmitted. The quality of the FD-IQ CoMP payload is also sent to the serving base station so that the serving base station can rank order and selectively use the inputs it receives. Time stamps are included in the FD-IQ CoMP payload so that the serving base station may alter the CoMP payload type. The time stamps co-packaged with the CoMP payload allows the serving base station to measure the delay from the cooperating base station to the serving base station. Thus, a serving base station may gather statistics concerning the delay and modify the payload type request for subsequent requests in anticipation of the learned delays.

When the base station 12 is functioning as a cooperating base station and if the CoMP payload type is selected to be LLR, the LLR Fwd block 40 extracts the target UEs LLRs. If the quality of the LLRs passes a quality threshold provided by the serving base station 12, the LLR packet is formed and transmitted. Thus, quality estimation is carried inherently in the LLRs. Time stamps are included in the LLR CoMP payload so that the serving base station may alter the CoMP payload type. The time stamps co-packaged with the CoMP payload allows the serving base station to measure the delay from the cooperating base station to the serving base station. Thus, a serving base station may gather statistics concerning the delay and modify the payload type request for subsequent requests in anticipation of the learned delays.

When the base station 12 is functioning as a cooperating base station and if the CoMP payload type is selected to be TB, the TB Fwd block 42 extracts the target UE's TB. If the TB passes a cyclic redundancy check, CRC, the TB packet is formed and transmitted. Quality estimation is carried in the TB inherently. Time stamps are included so that the serving base station may alter the CoMP payload type requested in subsequent requests.

The deadline management block 32 ensures that the processes that must be completed by a deadline are not unduly stalled as the base station 12 waits for incoming CoMP payload data.

The admission control block 44 makes decisions as to which scheduled UEs will be admitted to UL-CoMP support by evaluating, during each transmission time interval, TTI, at least one of a load on a processor of the base station 12 and a congestion level on the link 18. The evaluation deadline is based on scheduler quality of service (QoS), related deadlines and modulation and coding scheme selection that occurs within a MAC within the radio stack 46. The admission control block 44, decides which type of CoMP payload is to be requested the cooperating base stations. Requests for different types of CoMP payloads may be sent to different cooperating base stations.

Thus, the admission control block 44 ensures that CoMP support is provided only for UEs that will benefit from CoMP support. The admission control block 44 also manages serving base station requests based on metrics such as history to limit late CoMP payload packet delivery. In-bound congestion is managed based on the types of payload requested in order to limit late CoMP payload packet delivery.

The CoMP payload competes with other traffic flowing from the out-bound backhaul interface 26 as it exits the base station 12. In some embodiments, a transmit priority block 49 schedules transmission of the CoMP payload to achieve a QoS for the out-bound backhaul interface 26 that includes the CoMP payload quality and CoMP payload user QoS.

Figure 3:
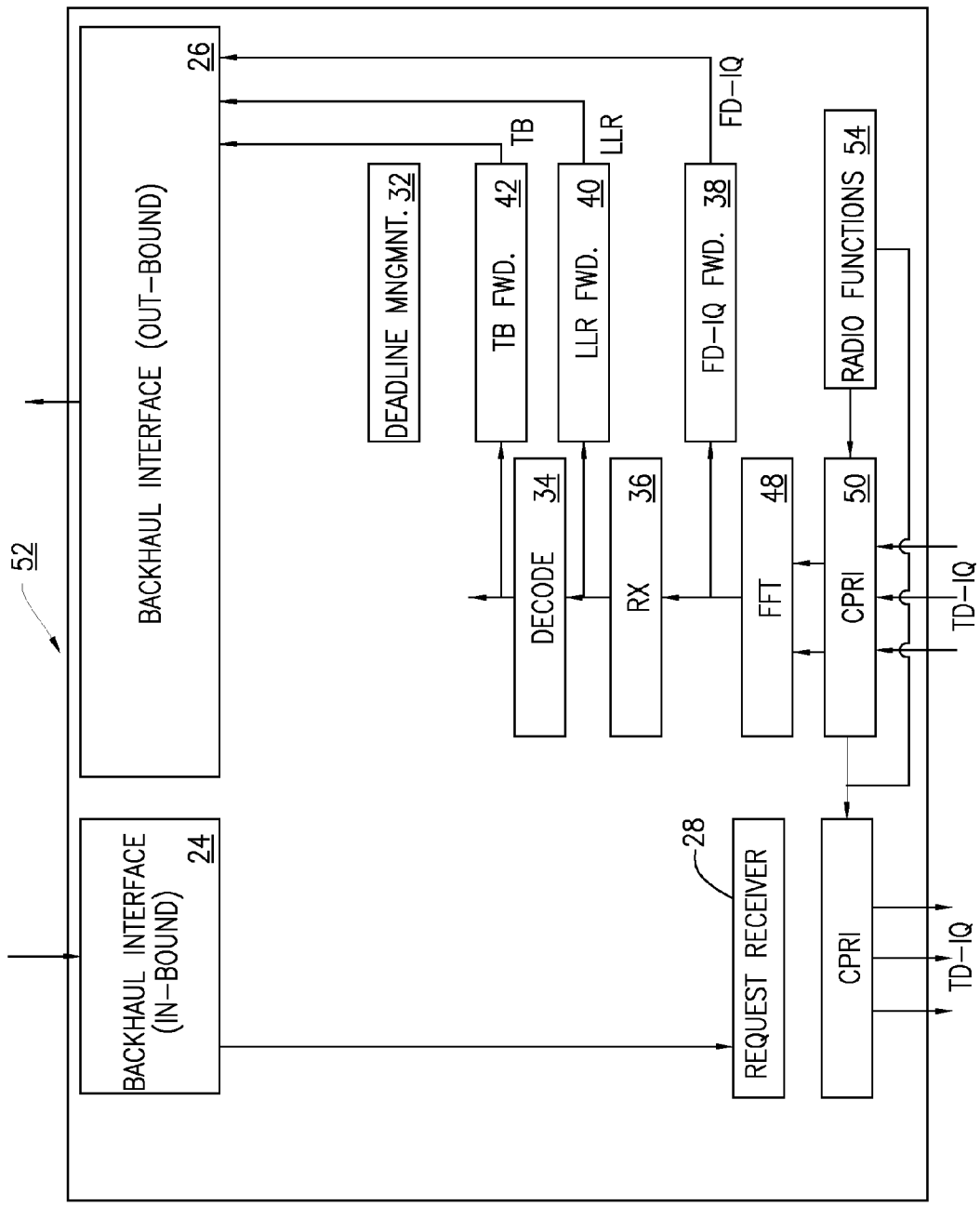
FIG. 3 is a block diagram of an exemplary radio unit constructed in accordance with principles of the present invention.
Figure 4:
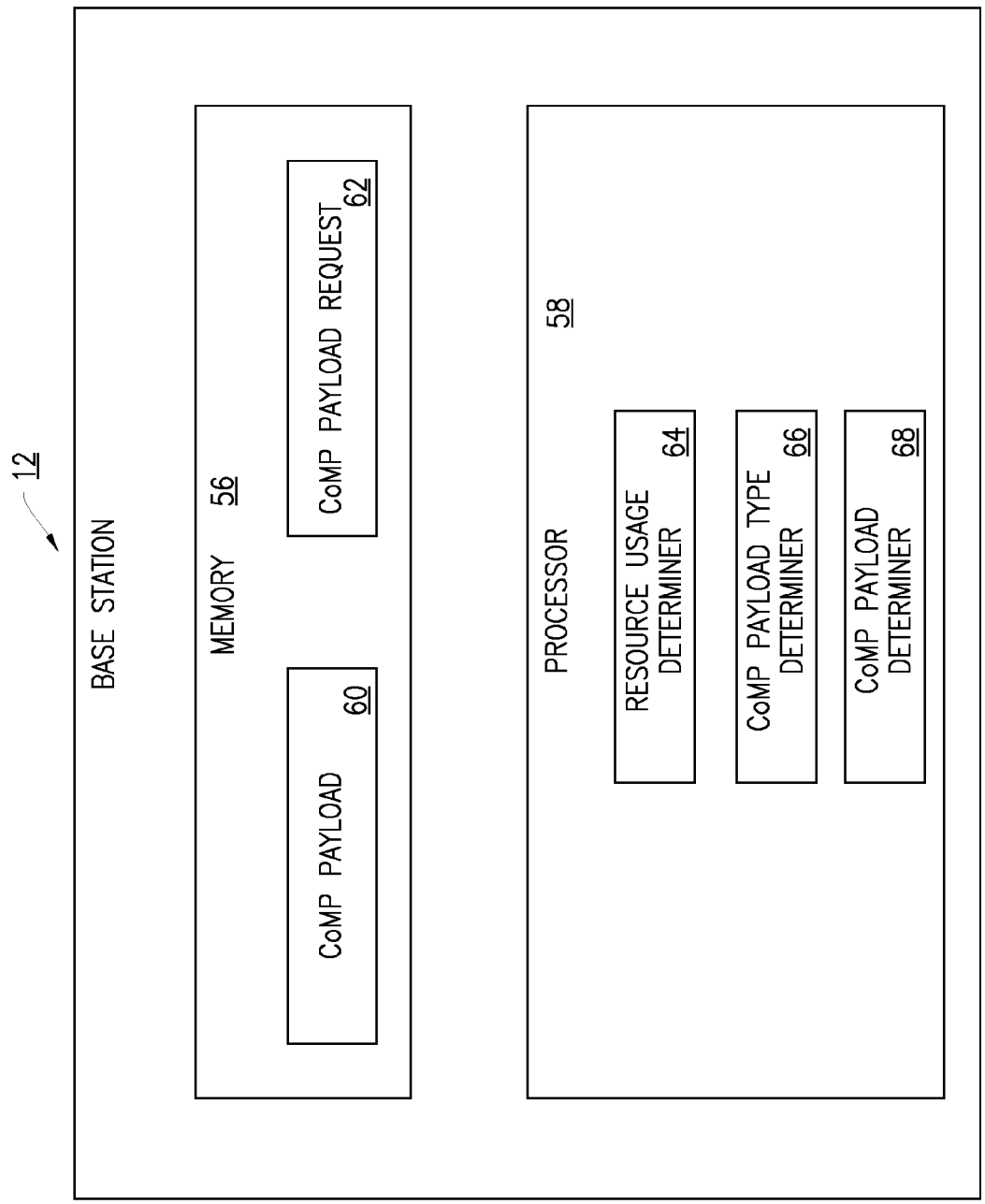
FIG. 4 is a block diagram of an exemplary base station that includes a memory and a processor for performing coordinated multipoint support in accordance with principles of the present invention.

The base station 12 also includes a fast Fourier transform, FFT, unit 48 for computing a FFT of signals received over a common public radio interface CPRI 50, which is also referred to herein as radio equipment (RE). The CPRI interface 50 provides an interface between the base station and remote radios, such as the remote radio 52 of FIG. 3. Much of the structure of the remote radio 52 of FIG. 3 is the same as the structure of the base station 12, but also includes radio functions 54. The radio functions 54 include modulation, demodulation, down conversion and up conversion of RF signals. Thus, in some embodiments, the radio unit 52 may communicate directly with the backhaul link without a base station interposed between the radio unit and the backhaul link.

Although FIGS. 2 and 3 show logical blocks for performing the functions as described above, these functional blocks may be implemented by a memory and a processor programmed to perform the described functions. Thus, one embodiment of a base station 12 includes a memory 56 and a processor 58. The memory 56 is configured to store payload data 60 associated with a CoMP payload type requested by a serving base station or to be sent to a serving base station. The memory 56 also stores a CoMP payload request 62 received from a serving base station or to be sent to a cooperating base station.

The processor 58 includes a resource usage determiner 64 that determines a load on the base station or a level of congestion on a backhaul link 18. The processor of a cooperating bases station 58 also includes a CoMP payload type determiner 66 that determines a type of CoMP payload to send to a serving base station. The CoMP payload determiner 68 determines a payload of the determined type to send to the serving base station. The processor 58 of a serving base station is configured to formulate a CoMP request that specifies a preferred CoMP payload type and to process a received CoMP payload from a cooperating base station. Further, the processor of the serving base station may perform switch diversity when the received CoMP payload type is a TB payload, perform hybrid automatic repeat request, HARQ, diversity when the received CoMP payload is an LLR payload, and perform analysis of the available CoMP payloads when the received CoMP payload is an FD-IQ payload.

Figure 5:
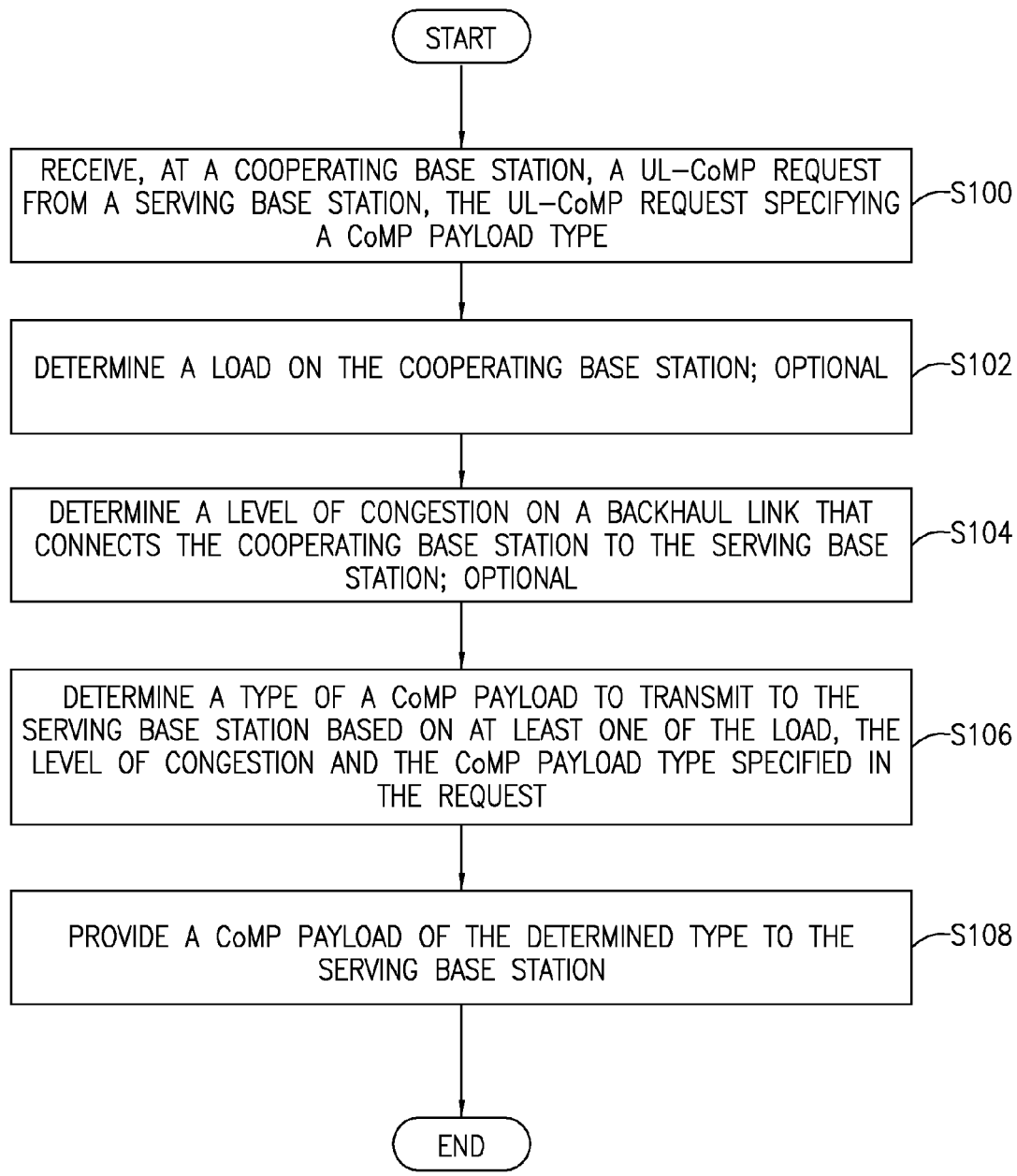
FIG. 5 is a flowchart of an exemplary process for providing adaptive coordinated multipoint support in accordance with principles of the present invention.

FIG. 5 is a flowchart of an exemplary process for processing CoMP requests at a cooperating base station. The cooperating base station receives a CoMP request from a serving base station that specifies a preferred CoMP payload type (S 100). Optionally, the cooperating base station will determine its current load (S102) and will optionally determine a level of congestion on a backhaul link that facilitates communication between the cooperating base station and the serving base station (S104). The cooperating base station determines a type of CoMP payload to send to the serving base station based at least in part on one of the load, the level of congestion and the preferred CoMP payload type specified by the serving base station (S 106). For example, if the level of congestion is high, the determined payload type may be the TB CoMP payload type, whereas if the level of congestion is low, the determined payload type may be the TD-IQ CoMP payload type. The cooperating base station sends a CoMP payload of the determined type to the serving base station (S 108).

Figure 6:
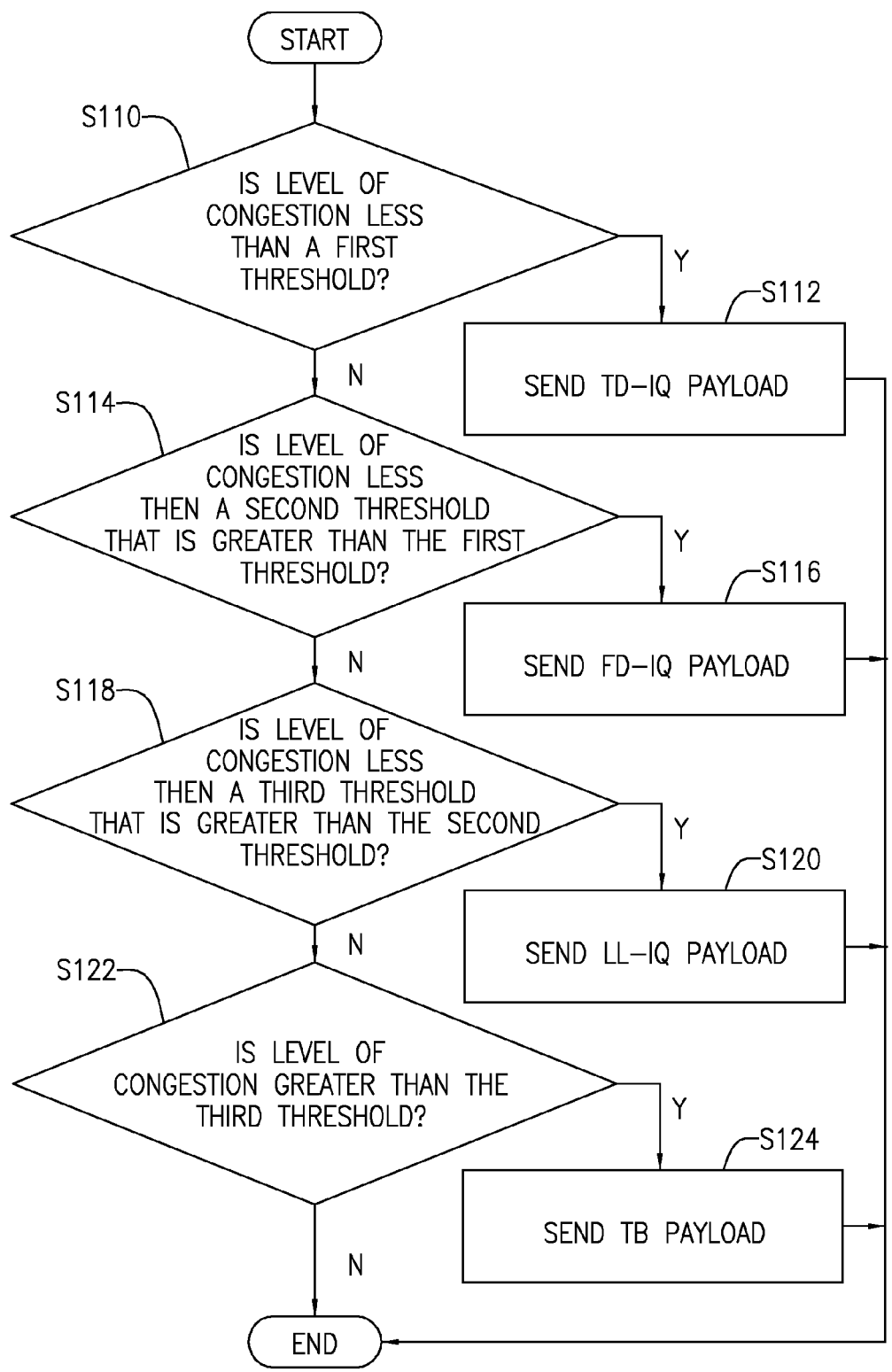
FIG. 6 is a flowchart of an exemplary process for determining a type of coordinated multipoint payload according to principles of the present invention.

FIG. 6 is a flowchart of an exemplary process for determining a type of payload to send from a cooperating base stations to a serving base station based on a level of congestion of a backhaul link that connects the cooperating base station to the serving base station. If the level of congestion is less than a first threshold (S110) then the TD-IQ payload is sent (S112) because a TD-IQ payload supports inter cellular joint processing which provides the highest air interface performance gains, but requires the highest inter cellular backhaul bandwidth. If the level of congestion on the backhaul link is less than a second threshold that is greater than the first threshold (S114), then the FD-IQ payload is sent (S116) because the FD-IQ payload supports inter cellular input and provides air interface performance gains with less demanding inter cellular backhaul bandwidth than TD-IQ payloads. If the level of congestion is less than a third threshold that is greater than the second threshold (S118), then an LLR payload is sent (S120) because the LLR payload supports inter cellular input and provides air interface performance gains with less demanding inter cellular backhaul bandwidth requirements than the FD-IQ payload. If the level of congestion is greater than the third threshold (S122) then the TB payload is sent (S124) because the TB payload supports inter cellular input and provides air interface performance gains with a minimum demand on inter cellular backhaul bandwidth. In an alternative embodiment, if the level of congestion is greater than a fourth threshold that is greater than the third threshold, then no payload is sent.

Thus, one embodiment is a coordinated multipoint CoMP method that includes receiving a CoMP request from a serving base station requesting assistance from the cooperating base station that receives the CoMP request. The CoMP request specifies a preferred CoMP payload type. Responsive to the CoMP request the cooperating base station determines a second type of CoMP payload to provide to the serving base station. The second CoMP payload type may be the same or different from the preferred CoMP payload type and depends at least in part on a resource usage. The resource usage may be a load on the cooperating base station or a level of congestion on a backhaul link that facilitates communication between the serving base station and the cooperating base station. The cooperating base station provides a CoMP payload of the determined type to the serving base station When a time domain IQ, TD-IQ, payload type is determined, the provided CoMP payload includes at least a fraction of a set of TD-IQ samples derived from a signal received from a user equipment by the cooperating base stations. When a frequency domain IQ, FD-IQ, payload type is determined, the provided CoMP payload includes at least a fraction of a set of FD-IQ samples derived from a signal received from a user equipment by the cooperating base station. Further, the cooperating base station may extract dominant interferers from the received signal before determining the fraction of the set of frequency domain IQ samples. When a log likelihood ratio LLR payload type is determined, the provided CoMP payload includes at least a fraction of a set of LLR values derived from a signal received from a user equipment by the cooperating base station. The fraction of LLR values may be determined by comparing LLR values to a threshold. When a transport block, TB, payload type is determined, the provided CoMP payload includes a TB received from a user equipment by the cooperating base station. The TB may be subjected to a cyclic redundancy check (CRC) before being provided as the CoMP payload.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An uplink coordinated multipoint, UL-CoMP, method, comprising:
   receiving, at a cooperating base station, a UL-CoMP request from a serving base station, the UL-CoMP request requesting assistance from the cooperating base station, the UL-CoMP request specifying a first CoMP payload type;
   responsive to receiving the UL-CoMP request, determining a second type of CoMP payload type to provide to the serving base station based at least in part on a level of congestion on a backhaul link, the first CoMP payload type being one of:
   a time domain IQ, TD-IQ, samples payload;
   a frequency domain IQ, FD-IQ, samples payload;
   a log-likelihood ratio, LLR, payload; and
   a transport block, TB, payload;
   the determining including:
      determining that the second CoMP payload type is the TD-IQ payload type when the level of congestion is less than a first threshold;
      determining that the second CoMP payload type is the FD-IQ payload type when the level of congestion is less than a second threshold that is greater than the first threshold;
      determining that the second CoMP payload type is the LLR payload type when the level of congestion is less than a third threshold that is greater than the second threshold; and
      determining that the second CoMP payload type is the TB payload type when the level of congestion is greater than the third threshold; and
   providing a CoMP payload of the determined second CoMP payload type to the serving base station.

2. The method of claim 1, wherein the second CoMP payload type is the same as the first CoMP payload type.

3. The method of claim 1, wherein the resource usage is one of a load on the cooperating base station and a level of congestion on a backhaul link that facilitates communication between the serving base station and the cooperating base station.

4. The method of claim 1, further comprising including in the CoMP payload at least a fraction of a set of time domain IQ samples derived from a signal received from a user equipment by the cooperating base station when a time domain IQ, TD-IQ, payload type is determined to be the second CoMP payload type.

5. The method of claim 1, further comprising including in the CoMP payload at least a fraction of a set of frequency domain IQ samples derived from a signal received from a user equipment by the cooperating base station when a frequency domain IQ, FD-IQ, payload type is determined to be the second CoMP payload type.

6. The method of claim 5, further comprising extracting dominant interferers from the received signal.

7. The method of claim 1, wherein, when a log likelihood ratio, LLR, payload type is determined to be the second CoMP payload type, the provided CoMP payload includes at least a fraction of a set of LLR values derived from a signal received from a user equipment by the cooperating base station.

8. The method of claim 7, wherein the fraction is determined by comparing LLR values in the set to a threshold.

9. The method of claim 1, wherein, when a transport block, TB, payload type is determined to be the second CoMP payload type, the provided CoMP payload includes a TB received from a user equipment by the cooperating base station.

10. The method of claim 9, wherein the TB is subjected to a cyclic redundancy check, CRC, before being provided as the CoMP payload.

11. A cooperating communication network base station, comprising:
   a memory, the memory configured to store payload data associated with a CoMP payload type;
   a processor in communication with the memory, the processor configured to:
     receive a CoMP request from a serving base station;
     select one of a plurality of CoMP payload types of a CoMP payload having the payload data, the selection based at least in part on a level of congestion on a backhaul link, the selected one of the plurality of CoMP payload types being one of:
       a time domain IQ, TD-IQ, samples payload;
       a frequency domain IQ, FD-IQ, samples payload;
       a log-likelihood ratio, LLR, payload; and
       a transport block, TB, payload;
     the selecting including:
       selecting the TD-IQ payload type when the level of congestion is less than a first threshold;
       selecting the FD-IQ payload type when the level of congestion is less than a second threshold that is greater than the first threshold;
       selecting the LLR payload type when the level of congestion is less than a third threshold that is greater than the second threshold; and
       selecting the TB payload type when the level of congestion is greater than the third threshold; and
     send the CoMP payload of the selected type to the serving base station.

12. The cooperating communication network base station of claim 11, wherein the selected CoMP payload type is a time domain IQ, TD-IQ, samples payload type, and the CoMP payload includes at least a fraction of a set of time domain IQ samples derived from a signal received from a user equipment by the cooperating base station.

13. The cooperating communication network base station of claim 11, wherein the selected CoMP payload type is a frequency domain IQ, FD-IQ, samples payload type, and the CoMP payload includes at least a fraction of a set of frequency domain IQ samples derived from a signal received from a user equipment by the cooperating base station.

14. The cooperating communication network base station of claim 11, wherein the selected CoMP payload type is a log likelihood ratio, LLR, payload type, and the CoMP payload includes at least a fraction of a set of LLR values derived from a signal received from a user equipment by the cooperating base station.

\* \* \* \* \*